US008847669B2

(12) United States Patent
Park et al.

(10) Patent No.: US 8,847,669 B2
(45) Date of Patent: Sep. 30, 2014

(54) METHOD FOR CONTROLLING TEMPERATURE OF TERMINAL AND TERMINAL SUPPORTING THE SAME

(75) Inventors: Ki Yeon Park, Hwaseong-si (KR); Se Young Jang, Seongnam-si (KR); Chul Eun Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/543,262

(22) Filed: Jul. 6, 2012

(65) Prior Publication Data

US 2013/0027115 A1      Jan. 31, 2013

(30) Foreign Application Priority Data

Jul. 29, 2011    (KR) .................. 10-2011-0076215

(51) Int. Cl.
*H01L 35/00* (2006.01)
*G05D 23/19* (2006.01)

(52) U.S. Cl.
CPC .................. *G05D 23/1951* (2013.01)
USPC ........................................................ 327/513

(58) Field of Classification Search
USPC .................................................. 327/512, 513
See application file for complete search history.

(56) References Cited

U.S. PATENT DOCUMENTS

| 5,713,030 A | 1/1998 | Evoy |
| 5,825,674 A | 10/1998 | Jackson |
| 5,834,841 A | 11/1998 | Suzuki |
| 5,974,557 A * | 10/1999 | Thomas et al. ............... 713/322 |
| 5,978,864 A | 11/1999 | Hetherington et al. |
| 6,363,490 B1 * | 3/2002 | Senyk ........................... 713/300 |
| 6,484,265 B2 * | 11/2002 | Borkar et al. ................. 713/324 |
| 7,421,623 B2 * | 9/2008 | Haugh .......................... 714/47.2 |
| 8,237,482 B2 * | 8/2012 | Ge ................................ 327/291 |
| 8,489,745 B2 * | 7/2013 | Mandagere et al. .......... 709/226 |
| 2005/0289376 A1 | 12/2005 | Hartman et al. |
| 2007/0174650 A1 | 7/2007 | Won et al. |

FOREIGN PATENT DOCUMENTS

| JP | 4392590 B2 | 10/2009 |
| KR | 10-2010-0054669 A | 5/2010 |

* cited by examiner

Primary Examiner — Jeffrey Zweizig
(74) Attorney, Agent, or Firm — Jefferson IP Law, LLP

(57) ABSTRACT

A method for controlling a temperature of a terminal and a terminal supporting the same are provided. A terminal supporting temperature control includes a temperature sensor for detecting a temperature of the terminal, and a controller for performing at least one of a first throttle procedure including driving the controller with a first preset driving frequency when the temperature of the terminal detected by the temperature sensor is a first preset temperature, and driving the controller with a second driving frequency higher than the first driving frequency when the temperature of the terminal is reduced to a second preset temperature lower than the first preset temperature, and a second throttle procedure including driving the controller with the first preset driving frequency for a first time, and driving the controller with the second driving frequency higher than the first driving frequency for a second time after the first time elapses.

18 Claims, 7 Drawing Sheets

METHOD FOR CONTROLLING TEMPERATURE OF TERMINAL AND TERMINAL SUPPORTING THE SAME

PRIORITY

This application claims the benefit under 35 U.S.C. §119 (a) of a Korean patent application filed on Jul. 29, 2011 in the Korean Intellectual Property Office and assigned Serial No. 10-2011-0076215, the entire disclosure of which is hereby incorporated by reference.

BACKGROUND OF THE INVENTION

1. Field of the Invention

The present invention relates to temperature control of a terminal. More particularly, the present invention relates to a method for controlling a temperature of a terminal and a terminal supporting the same that restrict driving of a controller or functions of the terminal for temperature control of the terminal so that the terminal may maintain stable operations.

2. Description of the Related Art

With rapid development of technology, terminals have been developed to support various functions, such as image call, electronic organizer function, Internet function in addition to voice calls. The terminal supports a call function, a voice collecting function, an audio output function, and a screen display function for supporting a call function. Portable terminals are presently manufactured in such a fashion as to minimize thickness and maximize a screen area of the portable terminal's display unit. In order to create such a portable terminal, the density of the portable terminal's internal components should be increased. When the density of the internal components of the terminal is increased, the space available for dissipating heat during operation of the terminal is reduced such that emission of heat becomes difficult. When the terminal is operated at high loads or at high speed, heat accumulated in the internal components of the terminal is larger than that emitted internally or externally. When a temperature of the terminal increases according to accumulation of heat of the internal component of the terminal, the terminal may malfunction. When the temperature of the terminal increases significantly, a battery or internal components may be damaged. Furthermore, in an environment having a high ambient temperature, the ambient temperature influences the temperature of the terminal, negatively impacting the stability of the terminal.

SUMMARY OF THE INVENTION

Aspects of the present invention are to address at least the above-mentioned problems and/or disadvantages and to provide at least the advantages described below. Accordingly, an aspect of the present invention is to provide a method for controlling a temperature of a terminal supporting such that temperature control of the terminal may be efficiently and stably performed, and a terminal supporting the same.

Another aspect of the present invention is to provide a method for controlling a temperature of a terminal that limits diving of a controller of the terminal such that a temperature of the terminal is reduced or is converged to a constant temperature, and a terminal supporting the same.

Another aspect of the present invention is to provide a method for controlling a temperature of a terminal that restricts a load amount of a controller of the terminal such that a temperature of the terminal is reduced or is converged to a constant temperature, and a terminal supporting the same.

In accordance with an aspect of the present invention, a method for controlling a temperature of a terminal is provided. The method includes detecting a temperature of the terminal, and performing at least one of a temperature based first throttle procedure including driving a controller with a first preset driving frequency when the temperature of the terminal is a first preset temperature, and driving the controller with a second driving frequency higher than the first driving frequency when the temperature of the terminal is reduced to a second preset temperature lower than the first preset temperature according to the driving of the controller with the first driving frequency, and a time based second throttle procedure including repeatedly driving the controller with the first driving frequency for a first time when the temperature of the terminal is the first preset temperature, and driving the controller with the second driving frequency for a second time after the first time elapses.

In accordance with another aspect of the present invention, a terminal for supporting temperature control is provided. The terminal includes a temperature sensor detecting a temperature of the terminal, and a controller for performing at least one of a temperature based first throttle procedure including driving the controller with a first preset driving frequency when the temperature of the terminal detected by the temperature sensor is a first preset temperature, and driving the controller with a second driving frequency higher than the first driving frequency when the temperature of the terminal is reduced to a second preset temperature lower than the first preset temperature, and a time based second throttle procedure for driving the controller with the first preset driving frequency for a first time, and driving the controller with the second driving frequency higher than the first driving frequency for a second time after the first time elapses.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
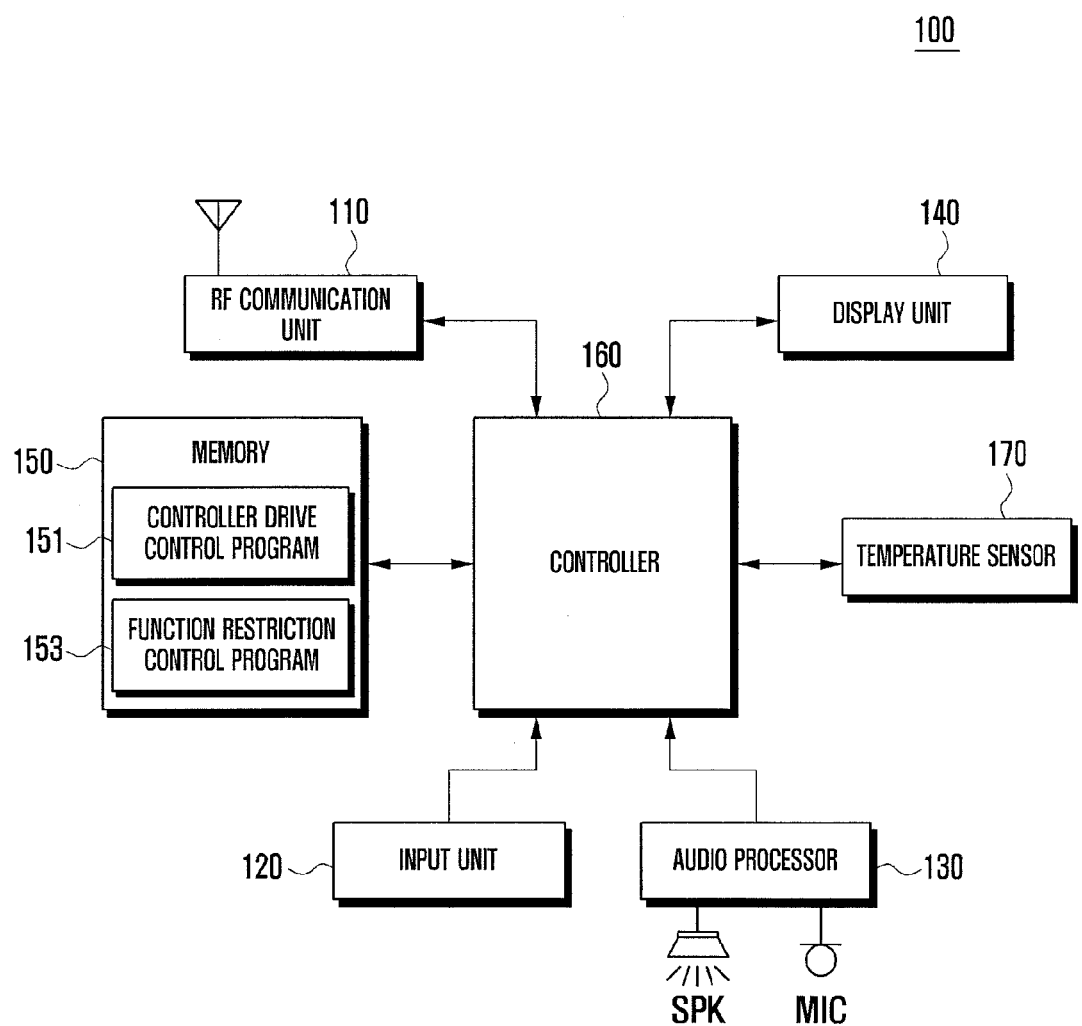
FIG. 1 is a block diagram illustrating a configuration of a terminal according to an exemplary embodiment of the present invention.

FIG. 1 is a block diagram illustrating a configuration of a terminal according to an exemplary embodiment of the present invention.

Referring to FIG. 1, a terminal 100 may include a radio frequency (RF) communication unit 110, an input unit 120, an audio processor 130, a display unit 140, a memory 150, a temperature sensor 170, and a controller 160.

The terminal 100 detects a temperature of the terminal 100 using the temperature sensor 170. When the detected temperature of the terminal 100 is within a preset temperature range, the terminal 100 adjusts a driving frequency of the controller 160 so as to adjust a temperature of the terminal 100. While adjusting the driving frequency of the controller 160, the controller 160 is adaptively driven according to a driving frequency of a constant range, thereby reducing the temperature of the terminal while maintaining a driving performance of the terminal 100, and securing stability and functionality of the terminal 100.

In addition, the terminal 100 operates the controller 160 with a preset time period with respect to a driving frequency of a constant range such that stability and functionality may be improved to control the terminal 100 suited to the taste of a user. The terminal 100 may control the limitation of an application program according to a temperature to further enhance the stability of the terminal 100. Operation of respective constructions associated with the foregoing temperature control of the terminal 100 and functions thereof are described below.

The RF communication unit 110 forms a communication channel with another terminal through a network device. The RF communication unit 100 may be configured by a communication module according to at least one of various communication schemes for forming the communication channel with the network device. For example, the RF communication unit 110 may be configured by at least one of communication modules supporting various communication schemes such as Wideband Code Division Multiple Access (WCDMA) and Orthogonal Frequency Division Multiple Access (OFDMA) schemes as well as communication modules supporting communication schemes such as CDMA and Global System for Mobile Communication (GSM) schemes.

The RF communication unit 110 may form a basic communication channel for a call function or a message service function and a data communication channel for a web access function under the control of the controller 160 in response to a request of the user. The formation function of the communication channel operated based on the RF communication unit 110 may be restricted according to adjustment of a driving frequency of the controller 160. For example, the formation in the data communication channel by the RF communication unit 110 may be restricted while maintaining the formation in the basic communication under the control of the controller 160. When a temperature of the terminal is greater than a predetermined temperature while the user activates a plurality of web browsers, the controller 160 may terminate at least one of the web browsers, and is not performed even though activation of the web browser is requested. In this case, the controller 160 may control such that certain web browsers having a relatively higher priority continue executing but web browsers having a relatively lower priority are terminated.

The input unit 120 may generate an input signal for supplying power, an input signal for activating the RF communication unit 110, an input signal for activating an application program to support various functions provided from the terminal 100, and an input signal for setting driving of the controller 160 according to a user input. The input unit 120 may generate and transfer the foregoing input signals to the controller 160 according to the control of the user. When the terminal 100 is includes a full touch screen, the input unit 120 may be configured by side keys or separate hot keys. The input unit 120 may be substituted by a key map displayed on a touch screen of the terminal 100. The input unit 120 may receive a plurality of input keys and function keys for receiving input of numerals or character information and for setting various functions. The function keys may include arrow keys, side keys, and hot key set such that specific functions are performed.

The audio processor 130 includes a speaker SPK for playing audio data, music files, or moving image files; and a microphone MIC for collecting a voice of the user or other audio signals. The audio processor 130 supports such that audio data generated during operation of various functions of the terminal 100 are output through the speaker SPK. The audio processor 130 may output a guide sound according to adjustment of a driving frequency of the controller 160. For example, when a temperature of the terminal 100 increases to a predetermined temperature so that the adjustment of a driving frequency is applied, the audio processor 130 may output a guide sound with respect to a driving frequency adjustment range stage, for example, a throttle setting stage or a driving frequency. When activation of a certain function is requested while function limitation is set according to the temperature of the terminal 100, the audio processor 130 may output a guide sound with respect to the limitation of a corresponding function. When an event for restricting a previously executed specific function is generated, the audio processor 130 may output a guide sound according to generation of the corresponding event. The output function of the guide sound may be adjusted according to presence of user setting or provision of the terminal. Accordingly, an output of a corresponding guide sound may be omitted.

The display unit 140 may provide various screens according to execution of an application program. The display unit 140 may also provide various screens according to use of the terminal 100, for example, an idle screen, a menu screen, a message creation screen, a call screen, a terminal termination screen, and a terminal booting screen. The display unit 140 may be a flat panel display such as a Liquid Crystal Display or an Organic Light Emitted Diode (OLED). The display unit 140 may include a display panel and a touch panel. The display unit 140 may include a touch screen to generate a user input signal for supporting functions. Accordingly, the user may generate various input signals using the display unit 140. For example, the user may generate an input signal for operation of a specific function using the display unit 140. A corresponding input signal may be transferred to the controller 160 and the controller 160 may control such that an application program corresponding to a user function according to the transferred input is activated.

The display unit 140 may output temperature information of the terminal 100 to a designated area of a screen. The display unit 140 may support output of information with respect to at least one of an ambient temperature, an internal temperature, and a temperature of a controller 160 of the terminal 100 according to the location and a type of the temperature sensor 170 provided at the terminal 100. The display unit 140 may output information with respect to adjustment of a driving frequency of the controller 160 according to a temperature of the terminal 100. For example, when the controller 160 operates during a first throttle setting section in which a driving frequency is adjusted according to increase in a temperature, the display unit 140 may output information corresponding to a corresponding operation state to the designated area of the screen. In this case, the display unit 140 may provide the temperature information and information associated with driving of the controller 160 temporarily or provide constantly display the temperature information and information associated with the driving of the controller 160 at the designated area. When the temperature of the terminal increases to a temperature requiring shutdown, the display unit 140 may output a guide message with respect to the shutdown before shutting down the terminal 100.

The memory 150 is an area in which various application programs and various data necessary for supporting driving and functions of the terminal are stored. The memory 150 may have a program area for storing the various application programs and a data area for storing various data. An operating system associated with the driving of the terminal 100 and application programs are stored in the program area. The memory 150 may store a drive control program 151 of a controller for controlling a driving frequency of the controller 160 according to a temperature of the terminal and a function restriction control program 153 supporting a function restriction associated with the drive control program 151 of a controller or separately according to a temperature of the terminal 100.

The drive control program 151 may include a routine for detecting temperature information of the terminal 100, a routine for comparing the detected temperature information with preset temperature information, an adjustment routine for adjusting a driving frequency of the controller 160 when the detected temperature information is within a preset temperature range, and a shutdown routine for controlling shutdown of the terminal 100 according to an increase in the temperature of the terminal. The adjustment routine may include a first adjustment routine for adjusting a driving frequency to a first driving frequency according to an increase in the temperature of the terminal 100, and a second adjustment routine for adjusting the driving frequency to the first driving frequency where temperature reduction is performed according to a first drive frequency operation of the controller 160 and becomes a predetermined temperature. The adjustment routine may include a multi-stage application routine for applying a throttle application routine repeatedly performing the first adjustment routine and the second adjustment routine in multi-stages by temperature ranges. An operation of the controller 160 according to the multi-stage application routine is described below.

The function restriction control program 153 includes routines for controlling such that activation of application programs in which activation request separately occurs or activated application program when the controller 160 operates according to an adjustment routine or regardless of the adjustment routine is restricted or terminated. The function restriction control program 153 may include a routine for determining activation of an adjustment routine, for determining priority information of currently activated application programs when the adjustment routine is activated or a temperature of the terminal increases to a certain temperature, a routine for terminating certain application programs or guiding termination of the application programs according to priority information, a routine for determining priority information of an application program in which activation is requested, and a routine for terminating an activated application program according to the priority information, for activating the requested application program, and for instructing that the activation request may not be performed and rejecting the request.

The function limitation control program 153 may provide current information of activated application programs, memory allotment information and load information of a controller 160 according to driving of an application program. Accordingly, the user may manually terminate certain application programs based on information of application programs provided from the function limitation control program 153 to stably operate the terminal 100. The data area may store various data and content or widgets generated during an operation procedure of the terminal 100. The data area stores priority information of the application programs, and temperature information set such that the adjustment routine and a forced termination routine are applied, and may be referred to according to the operation of the program.

The temperature sensor 170 is disposed at a predetermined location of the terminal 100. The temperature sensor 170 measures the temperature of the terminal 100, and provides detected temperature information to the controller 160. The temperature sensor 170 may be disposed at a side of an appearance of the terminal 100 to measure an ambient temperature. The temperature sensor 170 may also be disposed at an inner side of the terminal to measure an internal temperature of the terminal 100. The temperature sensor 170 may also include multiple temperature sensors to measure both ambient temperature and internal temperature. The temperature sensor 170 may be disposed adjacent to the controller 170 to measure a temperature of the controller 160 of the terminal 100. The temperature sensor 170 detects at least one of an ambient temperature and an internal temperature of the terminal, or a temperature of the controller 160, and transfers the detected temperature information to the controller 160.

Figure 4:
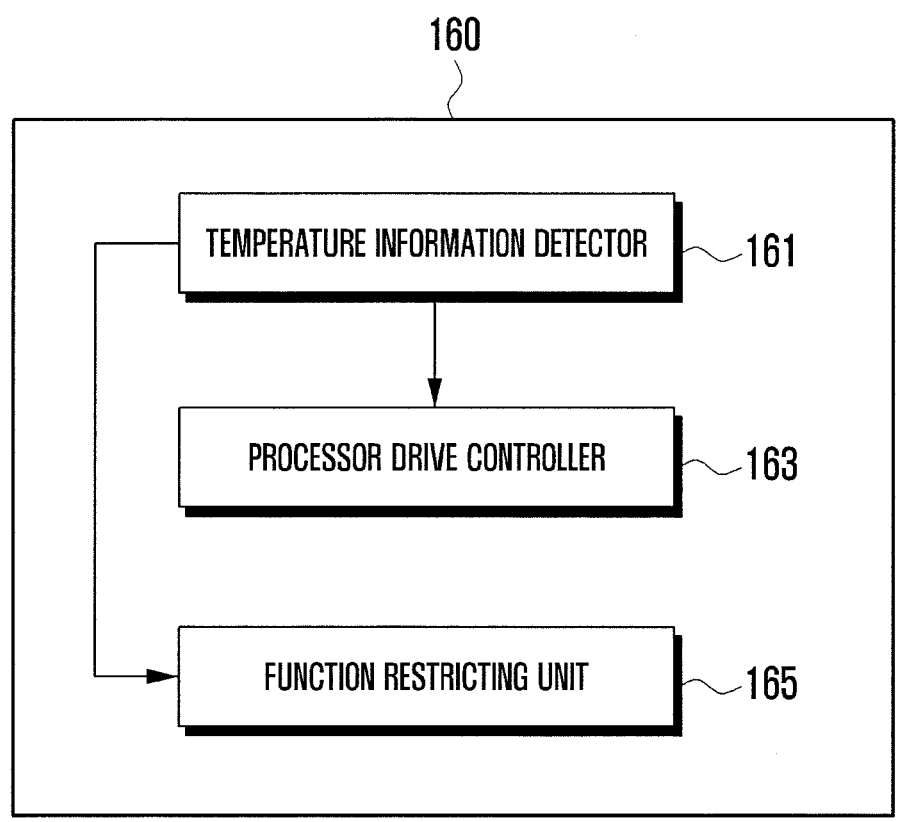
FIG. 4 is a view illustrating a configuration of a controller according to a second exemplary embodiment of the present invention.

When an input signal for certain function operation of the terminal is generated based on the display unit 140 having a function of the input unit or a separately provided input unit, the controller 160 may support such that a function corresponding to the input signal is performed. In particular, the controller 160 may perform various signal flows and operation control necessary to adjust a driving frequency according to a temperature of the terminal 100 of the present invention. The controller 160 may include a configuration as illustrated in FIG. 2 and FIG. 4.

Figure 2:
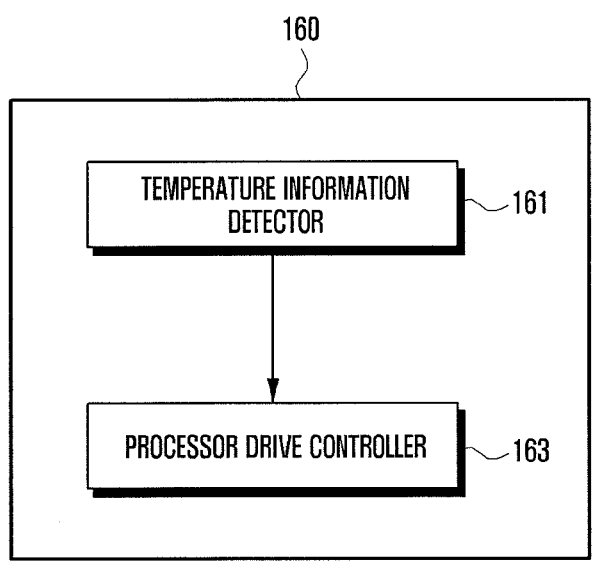
FIG. 2 is a block diagram illustrating a configuration of a controller according to a first exemplary embodiment of the present invention.
Figure 3:
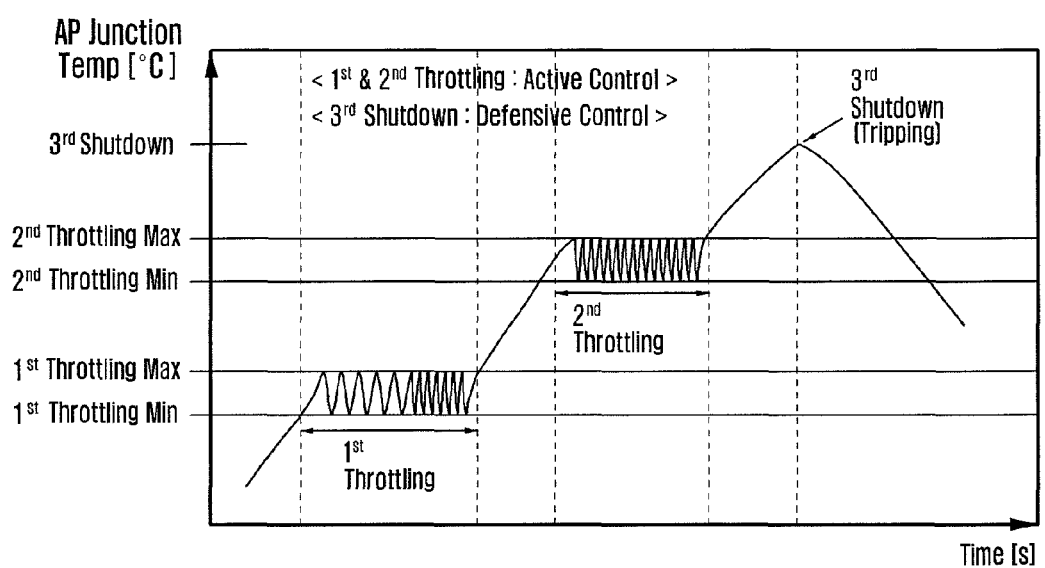
FIG. 3 is a view illustrating driving control of a processor drive controller according to an exemplary embodiment of the present invention.

FIG. 2 is a block diagram illustrating a configuration of a controller in detail according to a first exemplary embodiment of the present invention, and FIG. 3 is a view illustrating change in a driving frequency of a controller according to an exemplary embodiment of the present invention.

Referring to FIG. 2 and FIG. 3, the controller 160 includes a temperature information detector 161 and a processor drive controller 163.

The temperature information detector 161 detects temperature information detected from the temperature sensor 170 with a predetermined period or in real time. The temperature information detector 161 may detect an ambient temperature and an internal temperature of the terminal 100, and a temperature of the controller 160. The temperature information detector 161 may detect temperature information of the controller 160. The temperature information detector 161 determines whether the detected temperature information corresponds to preset temperature information. When the detected temperature information is equal to or greater than the preset temperature information, the temperature information detector 161 may transfer a corresponding result to a processor drive controller 163.

The processor drive controller 163 drives the controller 160 based on a preset driving frequency to support various functions of the terminal 100. The processor drive controller 163 may drive the controller 160 with a preset driving frequency, for example, 1.2 GHz, to support a function of the terminal 100. If the processor drive controller 163 receives information from the temperature information detector 161 indicating that a current temperature is equal to or greater than a preset temperature, the controller 160 may control a driving frequency to be operated with a first throttle setting range. When a temperature of the terminal 100, for example the temperature of the controller 160, corresponds to a first preset temperature, the processor drive controller 163 may limit operation of the terminal 100 such that a driving frequency of the controller 160 is driven with a first driving frequency. As the controller 160 is driven with the first driving frequency according to control of the processor drive controller 163, the temperature of the controller 160 may be reduced to a second preset temperature lower than the first preset temperature. Accordingly, the processor drive controller 163 may control such that the controller 160 is driven with a second driving frequency higher than the first driving frequency according to the second preset temperature.

When the temperature of the controller 160 of the terminal 100 increases to the first preset temperature, the processor drive controller 163 may control such that the controller 160 again operates with the first driving frequency lower than the second driving frequency. As illustrated above, when the temperature of the terminal 100 is within a preset temperature range, the processor drive controller 163 may support operation control according to a first throttle setting for controlling such that it operates within a preset driving frequency range. Through the foregoing procedures, the processor drive controller 163 reduces a temperature of the terminal 100 while securing a suitable driving performance, thereby supporting security of stability.

When the controller 160 of the terminal 100 operates with a first driving frequency, the temperature may exceed the first preset temperature for various reasons, such as activation of additionally requested functions, or various operation environments of the terminal, an ambient temperature, and accumulation of heat generated from the terminal 100. In this case, the processor drive controller 163 determines whether a temperature of the terminal 100 reaches a third preset temperature and may accordingly support second throttle setting application. When the temperature of the terminal 100 corresponds to the third preset temperature, the processor drive controller 163 may control such that a driving frequency of the controller 160 becomes the third driving frequency. The third driving frequency may be a driving frequency lower than the first driving frequency. As the controller 160 operates with the third driving frequency, the temperature of the terminal 100 may be reduced. When the temperature of the terminal 100 is reduced to the fourth preset temperature of the terminal 100, the processor drive controller 163 may control such that the driving frequency of the controller 160 becomes a fourth driving frequency higher than the third driving frequency. When the temperature of the terminal 100 increases to the third preset temperature according to an operation based on a fourth driving frequency of the controller 160, the processor drive controller 163 may control such that the controller 160 again operates with the third driving frequency. Through the foregoing repeated procedures, the terminal 100 of the present invention may reduced the temperature of the terminal 100 while securing a performance of the terminal 100 to some degree.

Although the terminal 100 operates with the third driving frequency, the temperature of the terminal may nevertheless still increase. When the temperature of the terminal 100 increases to the fifth preset temperature, the processor drive controller 163 may control such that the terminal 100 is shut down in order to maintain stability of the terminal 100. When the temperature of the terminal reaches the fifth preset temperature, the processor drive controller 163 may control such that a predetermined guide sound or a guide message with respect to forced shutdown is output. When a continuous increase in the temperature is expected after the temperature increases to a predetermined temperature lower than the fifth preset temperature, the processor drive controller 163 may control such that the guide sound or a guide message is output. If the temperature of the terminal 100 is continuously reduced to the first preset temperature after the controller 160 operates with a fourth driving frequency, the processor drive controller 163 may control such that the controller 160 operates with the first driving frequency according to the first preset temperature. If the temperature of the terminal 100 is reduced to the second preset temperature according to a continuous reduction in the temperature, the processor drive controller 163 may control such that the controller 160 operates with a second driving frequency.

As illustrated above, the processor drive controller 163 may control such that a driving frequency of the controller 160 becomes within a predetermined throttle setting section, thereby securing the performance while reducing a temperature of the terminal 100.

The forgoing setting temperature and the driving frequency will be described by way of example. A temperature range of first throttle setting may be 61~64° C., and a driving frequency of first throttle setting may be 800 MHz and 1.2 GHz. When the temperature of the terminal 100 increases to 64° C., the controller 160 may be controlled to be driven with 800 MHz. Accordingly, when the temperature of the terminal 100 is reduced to 61° C. being a second preset temperature, the processor drive controller 163 may be adjusted to be operated with 1.2 GHz being the second driving frequency. The second throttle setting temperature range may be 97~103° C. A second throttle setting driving frequency may be 200 MHz and 400 MHz. When the temperature of the terminal 100 increases to 103° C. being a third preset temperature, the controller 160 controls such that the controller 160 operates with 200 MHz being the third driving frequency. When the temperature of the terminal 100 is reduced to 97° C. being a fourth preset temperature according to temperature reduction, the processor drive controller 163 may control such that the controller 160 operates with 400 MHz being the fourth driving frequency.

When the temperature of the terminal 100 increases to the first preset temperature, the processor drive controller 163 may control such that the controller 160 is driven with a first driving frequency for a first time regardless of temperature reduction. The processor drive controller 163 may control such that the terminal 100 is driven with a second driving frequency for a second time after a first time elapses, and then the controller 160 is driven with a first driving frequency for the first time after the second time elapses. When the temperature of the terminal 100 increases to the first preset temperature, the processor drive controller 163 may control such that an operation of the controller 160 is repeatedly performed according to the first driving frequency and the second driving frequency. Through the foregoing operation control, the terminal 100 may control such that an operation for temperature reduction may be performed while securing a data processing performance of the terminal 100.

When the temperature of the terminal 100 increases to a third preset temperature, the processor drive controller 163 applies a third driving frequency and the fourth driving frequency to the controller 160 to control such that the controller 160 is repeatedly driven for a third time and a fourth time. The first time to the fourth time may be changed according to functionality security or stability security of the terminal 100. For example, so as to maintain a stable temperature of the terminal 100, the controller 160 may set the first time and the third time when it is driven with a relative lower driving frequency longer in comparison with the second time and the fourth time. So as to secure functionality of the terminal 100, the controller 160 may secure a section driven at low speed such that the temperature of the terminal 100 may be reduced by setting the second time and the fourth time longer in comparison with the first time and the third time.

The time setting may be fixed according to a terminal policy or be adjusted according to the user request.

Throttle setting values of the processor drive controller 163 of the present invention are not limited to the foregoing values. The throttle setting values of the processor drive controller 163 may be changed to various values according to a form or a design or a performance of the terminal 100. The foregoing exemplary embodiment has illustrated that a stage to which the throttle setting applied for driving the terminal 100 while changing a plurality of driving frequencies includes two steps by way of example. However, exemplary embodiments of the present invention are not limited thereto. The controller 160 *n* may divide a stage to which the throttle setting is applied into additional stages.

FIG. 4 is a view illustrating a configuration of a controller according to a second exemplary embodiment of the present invention.

Referring to FIG. 4, the controller 160 includes a temperature information detector 161, a processor drive controller 163, and a function restricting unit 165. Because the constructions of the temperature information detector 161 and the processor drive controller 163 are similar to those of the controller 160 according to the first exemplary embodiment, a detailed description thereof will be omitted.

The function restricting unit 165 may perform function restriction of an activated application program corresponding to a drive frequency change time or according to temperature information of the terminal 100 or may perform activation restriction of an application for which activation is requested. When the driving frequency of the controller 160 is changed or a temperature of the terminal 100 increases to a first preset temperature, the function restricting unit 165 may determine priority information of a currently activated application program, limit or terminate a function of an application program having a low priority, or support output of a message alerting the user to the termination of the function.

For example, when the temperature of the terminal 100 increases to the first preset temperature while a plurality of web browsers are executing, the function restricting unit 165 may control such that at least one web browser executing in the background processing and is not currently being displayed on the display unit 140 is terminated. The function restricting unit 165 may control such that a web browser having a relatively small list number is terminated while maintaining an active state of the most listed web browser according to a user history. The function restricting unit 165 may control such that a web browser not registered on a corresponding item is terminated while maintaining a web browser registered on a favorites list or a bookmark list. Each program may include priority according to temperature control, and a priority list including priority information may be stored in the memory 150 and be referred to according to a request of the function restricting unit 165.

An application program restriction function by the function restricting unit 165 may be changed according to changes in the preset temperature. When the temperature of the terminal is reduced to a second preset temperature lower than the first preset temperature, the function restricting unit 165 controls such that a previously terminated web browser may be re-activated or a guide message for re-activating the web browser may be output. When the temperature of the terminal 100 increases to a third preset temperature higher than the first preset temperature, the function restricting unit 165 may control such that an application program having a relatively low priority is terminated. In this case, the number of terminated application programs may be changed according to a preset temperature.

When activation of the application program occurs, the function restricting unit 165 may perform or reject a corresponding request according to a current temperature and priority information of the terminal 100. The function restricting unit 165 may control such that a currently activated application program having a priority lower than that of an application program in which activation is requested is terminated, and the application program in which activation is requested is activated. When priority information of the application program in which activation is requested is lower than that of a currently activated application program, the function restricting unit 165 may output a rejection message in response to activation request. When the activation request is again input despite the rejection message, the function restricting unit 165 may control such that an application program having relatively low priority information among currently activated application programs is terminated, or an application program designated by the user is terminated, and the application program in which activation is requested is activated. Through this procedure, the terminal 100 may support such that an application program required by the user is activated suited to a temperature state of the terminal 100. As a result, the terminal 100 restricts an active application program according to the temperature of the terminal 100 such that a load amount applied to the controller 160 is reduced or increased.

An application program restricting function of the function restricting unit 165 may be operated together with driving control of the controller 160 according to first throttle setting of the processor drive controller 160. When the currently detected temperature is the first preset temperature, the controller 160 may restrict a load amount under the control of the function restricting unit 165, namely, activated residual application program while adjusting and operating a driving frequency of the terminal 100 according to the first throttle setting. Accordingly, the terminal 100 may suitably secure a driving performance of an activated application program while supporting a stable state of the terminal 100 through adjustment of the load amount of the controller 160 together with adjustment of a driving frequency of the controller 160.

The foregoing exemplary embodiment has illustrated a construction and functions of the terminal for controlling a temperature according to an exemplary embodiment of the present invention. A method for controlling a temperature of a terminal according to an exemplary embodiment of the present invention is described below.

Figure 5:
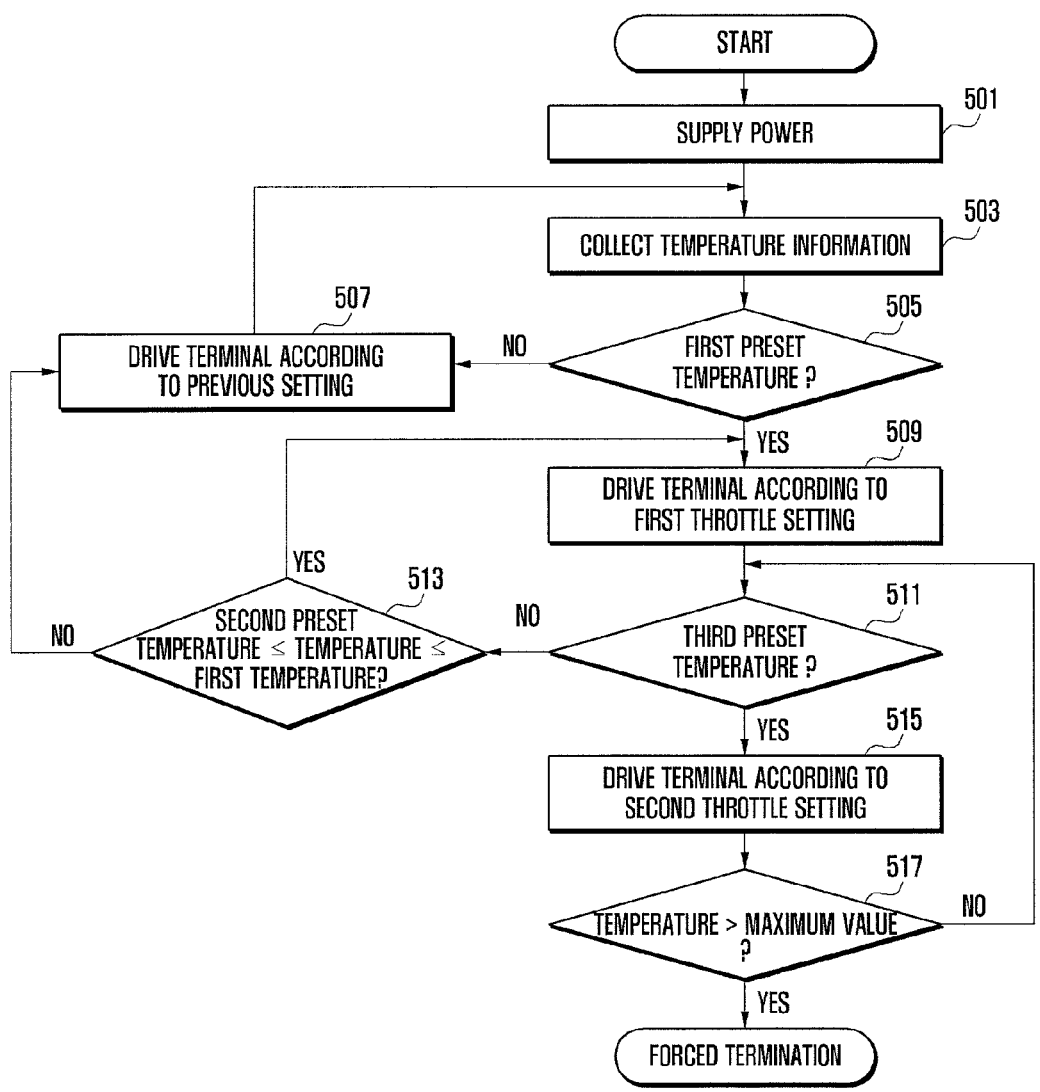
FIG. 5 is a flowchart illustrating a method for controlling a temperature according to a first exemplary embodiment of the present invention.

FIG. 5 is a flowchart illustrating a method for controlling a temperature according to a first exemplary embodiment of the present invention.

Referring to FIG. 5, the controller 160 may control such that power necessary for respective structures of a terminal 100 is supplied using power supplied from a power supply in step 501. The respective structures of the terminal 100 to which power is supplied may maintain a state for supporting a certain user function according to preset schedule information and an input signal received from the input unit 120 or the display unit 140 of an input function.

When a terminal drive control mode according to a temperature is activated, the controller 160 may control such that a temperature sensor 170 detects temperature information in step 503. The controller 160 may detect at least one of an ambient temperature and an internal temperature, and a temperature of the controller 160 according to the number and a location of the temperature sensor 170. When the terminal drive control mode according to the temperature is inactivated, the controller 160 may control such that the temperature sensor 170 is inactivated and the terminal 100 is operated according to a preset driving frequency without adjusting a separate driving frequency. However, the controller 160 activates a temperature sensor 170 for protecting the terminal 100 and the user. When the temperature detected by a corresponding temperature sensor 170 becomes a certain temperature, for example, a fifth preset temperature in which shutdown of the terminal is required, the controller 160 may control such that the terminal is shut down.

When the temperature information is detected, the controller 160 determines whether a temperature indicated by the detected temperature information corresponds to a first preset temperature in step 505. When the temperature does not correspond to the first preset temperature, the controller 160 may control such that the terminal is driven with a driving frequency according to a previous setting in step 507. After step 507, the controller 160 may return to step 503.

When the detected temperature corresponds to the first preset temperature at step 505, the controller 160 may control such that it the controller 160 is driven according to the first throttle setting in step 509. The throttle setting may indicate that the controller 160 operates while changing a frequency between a plurality of driving frequencies of a predetermined range. For example, when the temperature of the terminal 100 increases to the first preset temperature, the controller 160 may control the terminal 100 to be operated with a first driving frequency lower than a previous driving frequency.

When the temperature of the terminal 100 is reduced to a second preset temperature lower than the first preset temperature, the controller 160 may control such that the terminal 100 is operated with a driving frequency higher than the first driving frequency or a previous driving frequency. The controller 160 may control such that temperature information is detected periodically or in real time while driving the terminal 100 according to the first throttle setting.

The controller 160 may determine whether a temperature of the terminal 100 increases to a third preset temperature in step 511. The third preset temperature is a temperature higher than the first preset temperature. When the temperature is less than the third preset temperature, the controller 160 may determine whether the detected temperature is equal to or greater than the second preset temperature and less than or greater than the first preset temperature in step 513. When the temperature is equal to or greater than the second preset temperature and less than or greater than the first preset temperature, the controller 160 may control the terminal to be driven according to first throttle setting in step 509. When the temperature is less than the second preset temperature, the controller 160 may control the terminal to be driven according to a previous setting in step 507.

When the temperature of the terminal 100 increases to the third preset temperature at step 511, the controller 160 may control the terminal to be driven according to second throttle setting in step 515. When the temperature of the terminal 100 increases to the third preset temperature, the controller 160 may control the terminal 100 to be operated with a third driving frequency. Accordingly, when the temperature of the terminal 100 is reduced to a certain temperature, i.e., a fourth preset temperature, greater than the first preset temperature but less than the third preset temperature, the controller 160 may control the terminal 100 to be operated with a fourth driving frequency greater than the third driving frequency and less than the first driving frequency. Although not shown, when the temperature of the terminal 100 is reduced from the fourth preset temperature to the first preset temperature, the controller 160 may control the terminal 100 to be again operated with the first driving frequency in step 509.

The controller 160 may determine whether a temperature detected during a procedure of detecting the temperature of the terminal 100 with a predetermined period or in real time reaches a maximum value in step 517. When the temperature of the terminal 100 reaches the maximum value, the controller 160 may control such that all functions of the terminal 100 are terminated by force. When the temperature of the terminal 100 does not reach the maximum value, the process goes to step 511 and the controller 160 compares the detected temperature with a preset temperature, and may control such that following operations may be repeatedly performed according to the comparison result.

The foregoing exemplary embodiment has illustrated that a driving frequency adjusting stage is divided into first throttle setting and second throttle setting. However, exemplary embodiments of the present invention are not limited thereto. More throttle setting stages may be provided in the terminal 100. The driving frequency of the controller 160 may be segmented. The terminal 100 may control a driving frequency according to the temperature of the terminal by omitting steps 511 and 515 and using only the first throttle setting stage without the second throttle setting stage.

Adjustment of a driving frequency of the terminal 100 is applicable by time periods when a current temperature of the terminal reaches the first preset temperature. The first throttle setting period based on a temperature drives the controller with a first preset driving frequency for a first time. The controller 160 is driven with a second driving frequency higher than a first driving frequency for a second time after a first time elapses according to a first throttle procedure based on a repeatedly performed time for a predetermined time.

Adjustment of a driving frequency of the terminal 100 may be substituted by a procedure for adjusting a driving frequency according to the foregoing time in a third temperature environment. The temperature based second throttle setting period drives controller 160 with a third driving frequency lower than the first driving frequency for a third time when the temperature of the terminal increases to a third preset time greater than the first preset time. A procedure for driving a controller with a fourth driving frequency higher than the third driving frequency and lower than the first driving frequency may be substituted by a time based second throttle procedure which is repeatedly performed for a predetermined time.

As a result, in the adjustment of a driving frequency for controlling a temperature of a terminal according to exemplary embodiments of the present invention, a second throttle procedure based on a temperature may be performed after performing a temperature based first throttle procedure, or a time based second throttle procedure may be performed after performing a temperature based first throttle procedure. In the adjustment of a driving frequency for controlling a temperature of a terminal, a time based second throttle procedure may be performed after performing a time based first throttle procedure or a temperature based second throttle procedure may be performed after performing a temperature based first throttle procedure.

As illustrated above, in the method for controlling a temperature according to an exemplary embodiment of the present invention, a driving frequency of the controller 160 is repeatedly changed according to temperature control of the terminal 100 to reduce the temperature of the terminal 100 while securing the performance of the terminal 100. Changes in the driving frequency is provided in multiple stages, the performance of the terminal 100 may be secured while adaptively processing a procedure in which a temperature increases by greater than a predetermined value, thereby adaptively providing functionality.

Figure 6:
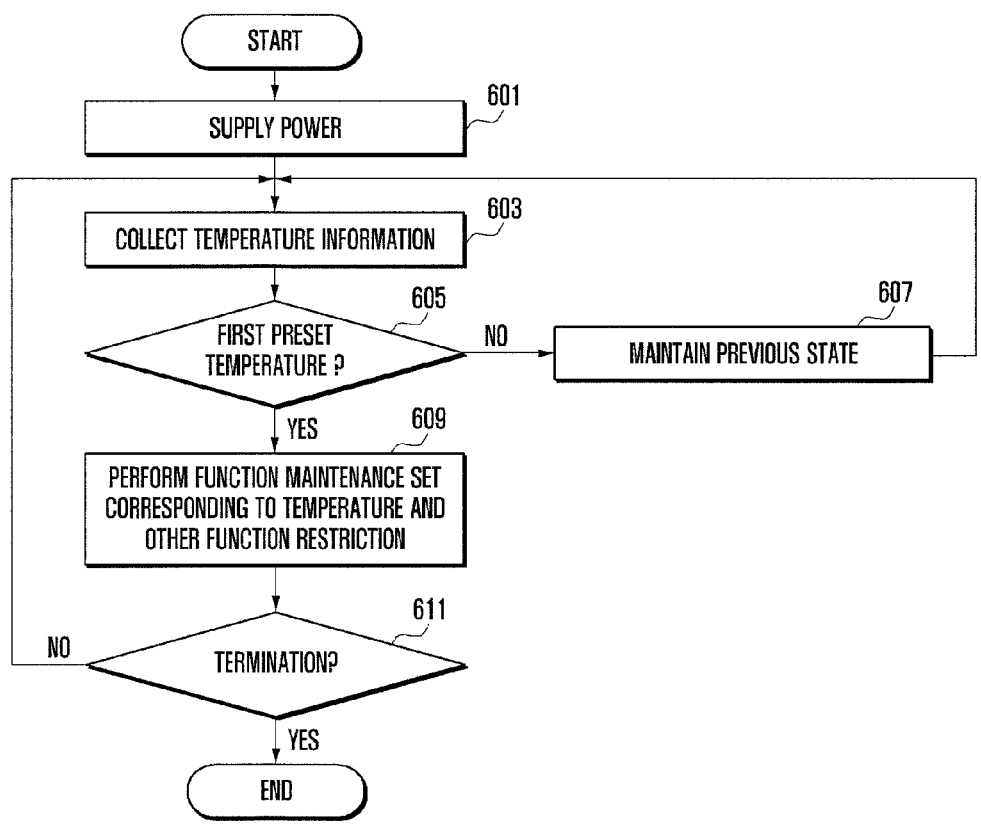
FIG. 6 is a flowchart illustrating a method for controlling a temperature according to a second exemplary embodiment of the present invention.

FIG. 6 is a flowchart illustrating a method for controlling a temperature according to a second exemplary embodiment of the present invention.

Referring to FIG. 6, in the same manner in step 501 as illustrated above, a controller 160 may control such that power necessary for respective structures of a terminal 100 is supplied using power supplied from a power supply in step 601. The respective structures of the terminal 100 to which power is supplied may maintain a state for supporting a certain user functions according to preset schedule information and an input signal received from an input unit 120 or a display unit 140 of an input function.

When a terminal drive control mode according to a temperature is activated, the controller 160 may control such that the temperature sensor 170 detects temperature information in step 603. The controller 160 may detect at least one of an ambient temperature and an internal temperature, and a temperature of the controller 160 according to the number and a location of the temperature sensor 170. When the terminal drive control mode according to the temperature is inactivated, the controller 160 may control such that the temperature sensor 170 is inactivated and the terminal 100 is operated according to a preset driving frequency without adjusting a separate driving frequency.

When the temperature information is detected, the controller 160 determines whether a temperature indicated by the temperature information corresponds to a first preset temperature in step 605. When the temperature included in the temperature information is less than a certain temperature at step 605, the controller 160 may control such that a previous state is maintained in step 607.

When the detected temperature is equal to or greater than a certain temperature at step 605, the controller 160 may control such that function maintenance set corresponding to a temperature and other function restriction are performed in step 609. When the detected temperature is equal to or greater than the certain temperature, the controller 160 may control such that at least one currently activated application program is restricted according to preset information. The controller 160 may determine priority information of currently activated application programs and control such that at least one application program having relatively low priority information is terminated or a guide message for terminating the application program is output.

The restricted number of the application programs may be adjusted corresponding to certain temperature information. When the current temperature is a certain temperature corresponding to a first preset temperature, the residual restricted number of application programs designated to be activated may be previously set. For example, the controller 160 may control such that application programs having relatively low priority information except for four application programs are terminated or a guide message is output on a display unit 140. When a current temperature is a third preset temperature, the residual restricted number of application programs may be set to be restricted to two. In this case, the controller 160 may limit the number activated application programs to two according to priority information of the applications. The controller 160 may restrict an activated application program to maintain the limited number of application programs according to increase in the temperature. The controller 160 may block a communication function of a corresponding application program without terminating an application program or perform restriction of a function so that only some application functions may be used.

The controller 160 may control application programs such that the predetermined number of application programs is reactivated according to reduction in the temperature of the terminal 100 or such that a guide message is output. The controller 160 may control such that restriction of an application program whose function has been restricted is released. For example, when a current temperature is a second preset temperature limiting the number of activated application programs to six, the controller 160 may control such that a previously application program is reactivated or a guide message for activation thereof is output. When a current temperature is reduced to a predetermined temperature associated with restriction release of restricted application program, the controller 160 may control such that a blocked function, e.g., a communication of a certain application program is reactivated according to a reduced temperature and the previous setting.

When an input signal is generated requesting activation of a certain application program in a temperature state in which a limited number of application programs may be activated simultaneously, or an input signal is generated for releasing restricted functions, the controller 160 may perform activation or release of an application program or corresponding request rejection according to priority of a corresponding application program. The controller 160 confirms a priority of an application program in which activation or function restriction release is requested. When activation or release of an application program having a relatively high priority is requested, the controller 160 may control such that at least one of currently activated application programs and the requested program is activated. When priority information of an application in which activation or function restriction release is requested is lower than that of a currently activated application program, the controller 160 may reject a corresponding rejection and output a guide message according to the rejection.

When another activation request is input after the rejection, the controller 160 may control such that an application program in which activation is requested is activated regardless of priority information, and restrict an application program having a relatively low priority of currently activated application programs. The controller 160 may adjust priority information of an application program in which the activation is requested to be higher than a previous value. The priority information of the application programs may be defined by a manufacturer of the terminal 100 and/or a developer of an application program. The priority information may be changed according to user setting or to a use history of an application program of the user except for several application programs necessary or designed to be necessary for an operation of the terminal 100.

The controller 160 determines whether a shutdown event of the terminal 100 occurs in step 611. When the shutdown event of the terminal 100 occurs, the controller 160 controls such that the terminal 100 is shut down. When no shutdown events of the terminal 100 occur, the process may return to step 603. The termination event may include a case where an input signal for terminating the terminal 100 is generated or a case where the temperature of the terminal 100 becomes a preset maximum value, for example, a fifth preset temperature.

As illustrated previously, the method for controlling a temperature according to an exemplary embodiment of the present invention may restrict an application program executed or executable according to the temperature of the terminal 100 to limit a load of the controller 160 while securing a processing performance, thereby converging the temperature of the terminal 100 to a constant temperature without reducing a temperature of the terminal 100 or without increasing the temperature.

Figure 7:
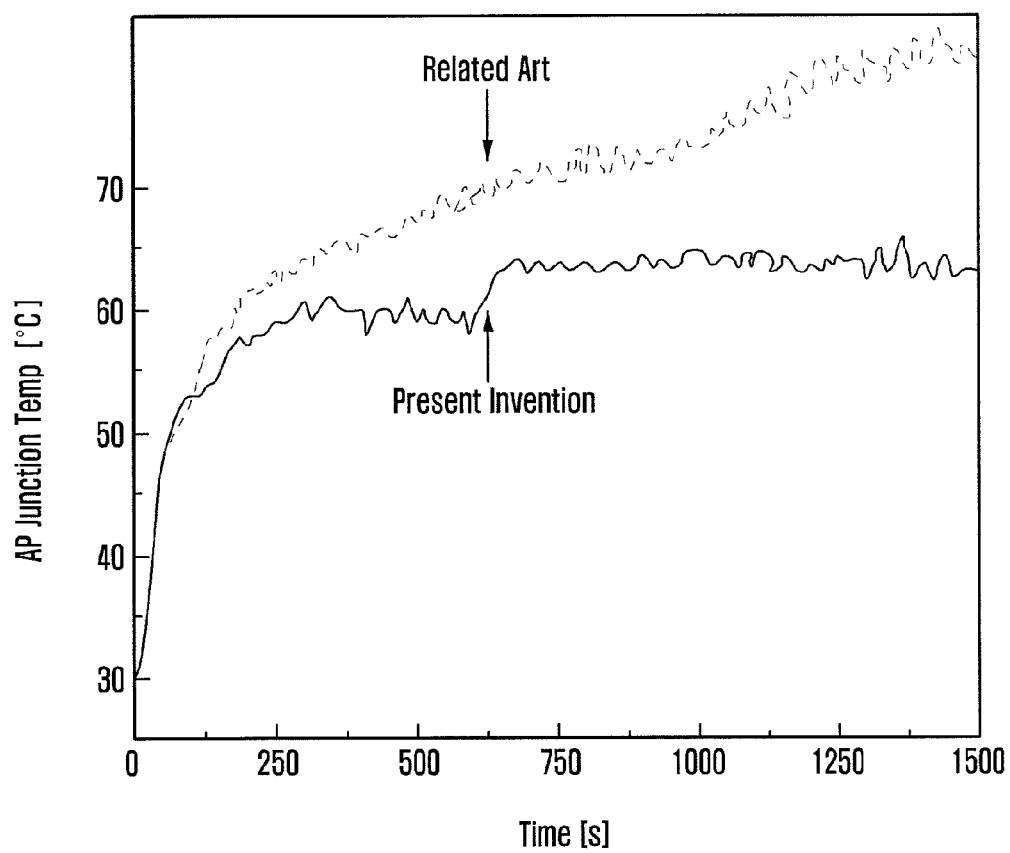
FIG. 7 is a graph illustrating a temperature convergence of a terminal according to a method for controlling a temperature according to an exemplary embodiment of the present invention.

FIG. 7 is a temperature variation graph according to a method for controlling a temperature and temperature control of a terminal according to an exemplary embodiment of the present invention.

Referring to FIG. 7, the temperature of the terminal 100 converges to a predetermined temperature without increase according to first throttle setting, and the temperature converges to the predetermined temperature without increase according to second throttle setting in a continuous temperature increase. Accordingly, exemplary embodiments of the present invention may secure a suitable performance of the terminal 100 such that the temperature of the terminal 100 does not increase beyond a predetermined temperature.

As mentioned above, a method for controlling a temperature and a terminal supporting the same according to an exemplary embodiment of the present invention may adjust a driving frequency of a controller to reduce the temperature according to temperature increase of the terminal and perform function restriction of an execution application program to suppress temperature increase or reduce the temperature while securing the performance of the terminal.

The foregoing terminal 100 may further include various additional modules. When the terminal 100 is a communication terminal, the terminal 100 may include elements that are not mentioned, such as a camera module for photographing still images/moving images of a subject, an interface for exchanging data in a wired communication scheme or a wireless communication scheme of the terminal 100, an Internet communication module for communicating with the Internet to perform an Internet function, and a digital broadcasting module for receiving and broadcasting digital broadcasting. Since the structural elements may change according to convergence trend of a digital device, a description of these elements is omitted. However, the terminal 100 may include structural elements equivalent to the foregoing structural elements. The terminal 100 may be substituted by specific constructions in the foregoing arrangements according to the provided form or another structure. This can be easily understood to those skilled in the present art.

The terminal 100 according to an exemplary embodiment of the present invention may include a storage unit and may be any of various types of devices having a communication module for supporting a data communication service based thereon. For example, the terminal 100 may be an information communication device or a multimedia device, such as a Portable Multimedia Player (PMP), a digital broadcasting player, a Personal Digital Assistant (PDA), a music player (e.g., MP3 player), a portable game terminal, a smart phone, a notebook computer, and a handheld PC as well as various mobile communication terminals corresponding to various communication systems.

As mentioned above, in the method for controlling a temperature and a terminal supporting the same according to exemplary embodiment of the present invention, temperature control is performed while securing a driving performance of the terminal. Further, exemplary embodiments of the present invention may increase stability of the terminal with respect to a temperature to support stable driving of the terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling temperature in a terminal, the method comprising:
   detecting the temperature of the terminal; and
   adjusting a number of an activating application when the temperature of the terminal is equal to or higher than a first preset temperature, the activating application comprising a currently running application and an application to be activated later.

2. The method of claim 1, wherein the adjusting of the number of the activating application comprises:
   determining a priority of the currently running application; and
   terminating the at least one currently running application having a low priority among the currently running applications when the number of the currently running application is higher than a predetermined number of an executable application.

3. The method of claim 2, wherein the predetermined number of the executable application comprises:
reducing the predetermined number of the executable application when the temperature of the terminal reaches another preset temperature being higher than the first preset temperature; and
increasing the predetermined number of the executable application when the temperature of the terminal decreases from the first preset temperature to another preset temperature being lower than the first preset temperature.

4. The method of claim 2, further comprising:
receiving a request to activate a new application;
determining a priority of the new application; and
rejecting an activation of the new application or sending a rejection message when the priority of the new application is lower than that of the currently running application.

5. The method of claim 4, further comprising:
terminating at least one currently running application having the low priority among the currently running applications and activating the new application when the new application is requested to be activated after the rejection.

6. The method of claim 2, further comprising:
receiving a request to activate the new application;
determining a priority of the new application; and
terminating the at least one currently running application and activating the new application when the priority of the new application is higher than that of the at least one currently running application.

7. The method of claim 1, further comprising performing at least one of:
a temperature based first throttle procedure including driving a controller with a first preset driving frequency when the temperature of the terminal is the first preset temperature, and driving the controller with a second driving frequency higher than the first driving frequency when the temperature of the terminal is reduced to a second preset temperature lower than the first preset temperature according to the driving of the controller with the first driving frequency; and
a time based first throttle procedure including repeatedly driving the controller with the first driving frequency for a first time when the temperature of the terminal is the first preset temperature, and driving the controller with the second driving frequency for a second time after the first time elapses.

8. The method of claim 7, further comprising performing a temperature based second throttle procedure including:
driving the controller with a third driving frequency lower than the first driving frequency when the temperature of the terminal increases to a third preset temperature greater than the first preset temperature, and
driving the controller with a fourth driving frequency greater than the third driving frequency and lower than the first driving frequency when the temperature of the terminal is reduced to a fourth preset temperature lower than the third preset temperature according to the driving of the controller with the third driving frequency.

9. The method of claim 7, further comprising performing a time based second throttle procedure including:
driving the controller with a third driving frequency lower than the first driving frequency for a third time when the temperature of the terminal increases to a third preset temperature greater than the first preset temperature, and
driving the controller with a fourth driving frequency greater than the third driving frequency and lower than the first driving frequency for a predetermined time.

10. A terminal for supporting control of temperature of the terminal, the terminal comprising:
a temperature sensor for detecting the temperature of the terminal; and
a controller,
wherein the controller comprises a function restricting unit for adjusting a number of an activating application when the temperature of the terminal is equal or higher than a first preset temperature, the activating application comprising a currently running application and an application to be activated later.

11. The terminal of claim 10, wherein the function restricting unit determines a priority of the currently running application, and terminates at least one application having a low priority among the currently running applications when the number of the currently running application is higher than a predetermined number of an executable application.

12. The terminal of claim 11, wherein the function restricting unit reduces the predetermined number of the executable application when the temperature of the terminal reaches another preset temperature being higher than the first preset temperature, and
wherein the function restricting unit increases the predetermined number of the executable application when the temperature of the terminal decreases from the first preset temperature to another preset temperature being lower than the first preset temperature.

13. The terminal of claim 11, further comprising:
an input unit or a display unit having an input function for generating an input signal for requesting activation of a new application,
wherein the function restricting unit determines a priority of the new application, and rejects an activation of the new application or sends a rejection message outputting on the display unit when the priority of the new application is lower than that of the currently running application.

14. The terminal of claim 13, wherein the function restricting unit terminates at least one application having the low priority among the currently running applications, and activates the new application is requested to be activated after the rejection.

15. The terminal of claim 11, further comprising:
an input unit or a display unit having an input function for generating an input signal for requesting activation of a new application,
wherein the function restricting unit determines a priority of the new application, terminates the at least one currently running application, and activates the new application when the priority of the new application is higher than that of the at least one currently running application.

16. The terminal of claim 10, wherein the controller further comprises performing at least one of:
a temperature based first throttle procedure including driving the controller with a first preset driving frequency when the temperature of the terminal detected by the temperature sensor is the first preset temperature, and driving the controller with a second driving frequency higher than the first driving frequency when the temperature of the terminal is reduced to a second preset temperature lower than the first preset temperature, and a time based first throttle procedure including driving the controller with the first preset driving frequency for a first time, and driving the controller with the second driving frequency higher than the first driving frequency for a second time after the first time elapses.

17. The terminal of claim 16, wherein the controller comprises a processor driver controller for controlling an operation performed according to a situation of the first preset temperature, for driving the controller with a third driving frequency lower than the first driving frequency when the temperature of the terminal increases from the first preset temperature to a third preset temperature, and for controlling the controller to be operated with a fourth driving frequency higher than the third driving frequency and lower than the first driving frequency when the temperature of the terminal is reduced to a fourth preset temperature lower than the third preset temperature.

18. The terminal of claim 16, wherein the controller comprises a processor drive controller for repeatedly driving the controller with a third driving frequency for a third time when the temperature of the terminal increases to a third preset temperature lower than the first driving frequency, and driving the controller with a fourth driving frequency higher than the third driving frequency and lower than the first driving frequency for a fourth time for a predetermined time.

* * * * *